United States Patent [19]
Boast

[11] Patent Number: 6,105,789
[45] Date of Patent: Aug. 22, 2000

[54] PLASTIC COMPONENT WITH O-RING RETAINER

[75] Inventor: Andrew J. Boast, Fontana, Wis.

[73] Assignee: Filtertek Inc., Hebron, Ill.

[21] Appl. No.: 09/226,817

[22] Filed: Jan. 6, 1999

Related U.S. Application Data

[60] Provisional application No. 60/070,949, Jan. 9, 1998.

[51] Int. Cl.[7] ................................................. B01D 35/02
[52] U.S. Cl. ............................................ 210/495; 428/131
[58] Field of Search ..................................... 210/171, 450,
210/495; 285/379, DIG. 918; 277/637,
642, 918, 928; 428/131

[56] References Cited

U.S. PATENT DOCUMENTS

| | | |
|---|---|---|
| 3,966,385 | 6/1976 | Spears . |
| 4,044,092 | 8/1977 | Spears . |
| 4,157,372 | 6/1979 | Kyomen . |
| 4,258,925 | 3/1981 | Guyton . |
| 4,708,632 | 11/1987 | Mitteregger et al. . |
| 5,217,731 | 6/1993 | Fallent . |
| 5,469,612 | 11/1995 | Collette et al. . |
| 5,509,666 | 4/1996 | Abraham et al. ................. 210/171 |
| 5,603,968 | 2/1997 | Tajiri et al. . |

FOREIGN PATENT DOCUMENTS 34 44 879 A1   7/1985   Germany .

OTHER PUBLICATIONS

"Nylon Filter" Author and date unknown.

*Primary Examiner*—Matthew O. Savage
*Attorney, Agent, or Firm*—Brinks Hofer Gilson & Lione

[57] ABSTRACT

A method and apparatus for forming a plastic component with at least a first and second set of integrally molded castellations for retaining an O-ring therebetween; the component therefrom; and further embracing a method and apparatus for forming such a plastic component comprising one or more filtration windows with filtration material outwardly of the castellations.

6 Claims, 4 Drawing Sheets

PLASTIC COMPONENT WITH O-RING RETAINER

This application claims the benefit of U.S. Provisional Application Ser. No. 60/070,949, filed Jan. 9, 1998.

BACKGROUND OF THE INVENTION

This invention relates to molding apparatus and plastic injection molding methods of producing plastic members incorporating an O-ring retainer and further including products incorporating filtration material molded therein.

There are many applications requiring a molded component to retain an O-ring. In these applications, it is often desirable to provide a groove in a component for receipt of an O-ring that provides a high quality seal at the juncture between the O-ring, the component, and the part which the O-ring encircles, such as a shaft or the like. However, this desirable O-ring feature has been compromised with the need for plastic components that can be manufactured efficiently and cost effectively. For example, in one prior art application requiring a clean hydraulic fluid about a shaft, a plastic member comprising concentric annular ribs with filtration material therebetween was used, with the effective seal between the shaft and the member relying upon a friction fit between an annular rib with filtration material and the shaft. Obviously, such a component is not as effective as an O-ring incorporated therein, which provides a high quality seal with the shaft.

In the manufacturing of plastic parts with interior placed O-rings, grooves on the interior diameter of a part may be made with collapsing cores. Examples of such an apparatus and method to produce such grooves are disclosed in U.S. Pat. Nos. 3,966,385 and 4,044,092. Without detailing their construction herein, suffice it to say that these molds are expensive, complicated, and difficult to maintain due to the complexity of their numerous moving parts that must be actuated during each operating cycle to obtain the desired groove in the resulting plastic parts. Further, they are generally limited in depth of groove creation due to internal geometries of the molding apparatus. Such a method and apparatus, although possible, may not be commercially practicable as to cost effectiveness of the method, resulting component and maintenance of the mold.

Instead of collapsing cores, it is conceivable that an O-ring groove is formed using conventional mold halves to produce two components, each forming only half the groove each, with the components then glued, cemented, melted, or the like together. Such a method is obviously uneconomical and could lead to a less than acceptable O-ring seal due to the multiplicity of parts and the like.

Alternatively, it may be possible to manufacture such a component by placing an O-ring into a two piece mold and molding a component about such an O-ring. However, such an in situ method requires particular component materials and complex interactions between the O-ring material and the overmolded portions of the molded product. Obviously, such a mold and method would involve complex and costly manufacturing apparatus and processes. Further, the resulting product may have inherent structural and material limitations.

THE SUMMARY OF THE INVENTION

The present invention contemplates an apparatus and method for molding a component that incorporates an O-ring retainer that meets the above needs. Specifically, the present invention contemplates a method for molding an O-ring retainer in a molded plastic part comprising, providing a first mold half having an axis, a cavity portion, and a plurality of first and second circumferential teeth about the axis with cavity defining surfaces, the first set having radial ends outward of the axis with surfaces with planar portions closest to the axis; providing a second mold half having an axis, a cavity portion, and a plurality of third and fourth circumferential teeth with cavity defining surfaces angularly displaced about the second mold half axis to mesh with the second and first teeth, respectively, of the first mold half when mated therewith, the second mold half third teeth set having radial ends outward of the second mold half axis with surfaces with planar portions closest to the second mold half axis; translating the first mold half relative to the second mold half along respective axes to thereby mate the first and second mold halves to form a cavity for the molded part; molding the part within the cavity to thereby form a part with a plurality of first and second axially displaced planar surfaces for retaining an O-ring.

Further, the present invention contemplates an apparatus for molding an O-ring retainer in a molded part, said apparatus having an axis of translation, a cavity therein for forming the part, and a parting line, comprising, a first mold half having an axis defining a portion of the cavity, the first mold half having a plurality of circumferential teeth about the axis, the first mold half teeth arranged in at least a first set and second set, the first set having radial ends outward of the first mold half axis with surfaces defining a segment of the cavity with surface portions thereof closest to the first mold half axis; a second mold half having an axis and defining a portion of the cavity, mating the first mold half along a parting line, the second mold half having a plurality of circumferential teeth about the second mold half axis, the second mold half teeth arranged in at least a third and fourth set angularly displaced about the second mold half axis to mesh with the teeth of the first mold half, the third teeth having radial ends outward of the second mold half axis with surfaces defining a segment of the cavity with surface portions thereof closest to the second mold half axis, whereby the cavity formed between the first and second mold halves thereby forms a part having a plurality of first and second segments with surfaces axially displaced from one another for retaining an O-ring.

Still further, the invention contemplates a monolithic molded plastic component adapted for receiving an O-ring comprising a generally plastic member having a bore therethrough, the member having a first and second set of monolithic castellations projecting into the bore and encircling the bore, and having an annular wall between the first and second castellations, thereby defining a gap therebetween into which the O-ring may be received. Further, the present method, apparatus, and component contemplates incorporation of a filtration medium in the plastic component.

Accordingly, the present invention provides, in one form, a plastic injection molded component with a series of molded internal circumferential castellations creating a retainer for an O-ring in the component. These castellations may be of various size and shape to suitably retain a wide range of O-rings of various diameters and exterior configurations. Further, in another form, there is presented in the apparatus a means for creating a filtration window radially outwardly from the O-ring retainer to permit the resulting component to perform a filtration and sealing function. In all forms of the apparatus, method and product herein described, it is believed that cost effective and efficient inventions are presented herein over that presently known.

Further, it is believed that the apparatus and method presented herein provide a wide variety of retainer geometry over the apparatus and methods presently known.

Other features and advantages of the present invention will become more fully apparent from the following description of the preferred embodiments, appended claims, and accompanying drawings.

DETAILED DESCRIPTION OF THE DRAWINGS AND PREFERRED EMBODIMENTS OF THE INVENTION

Figure 1:
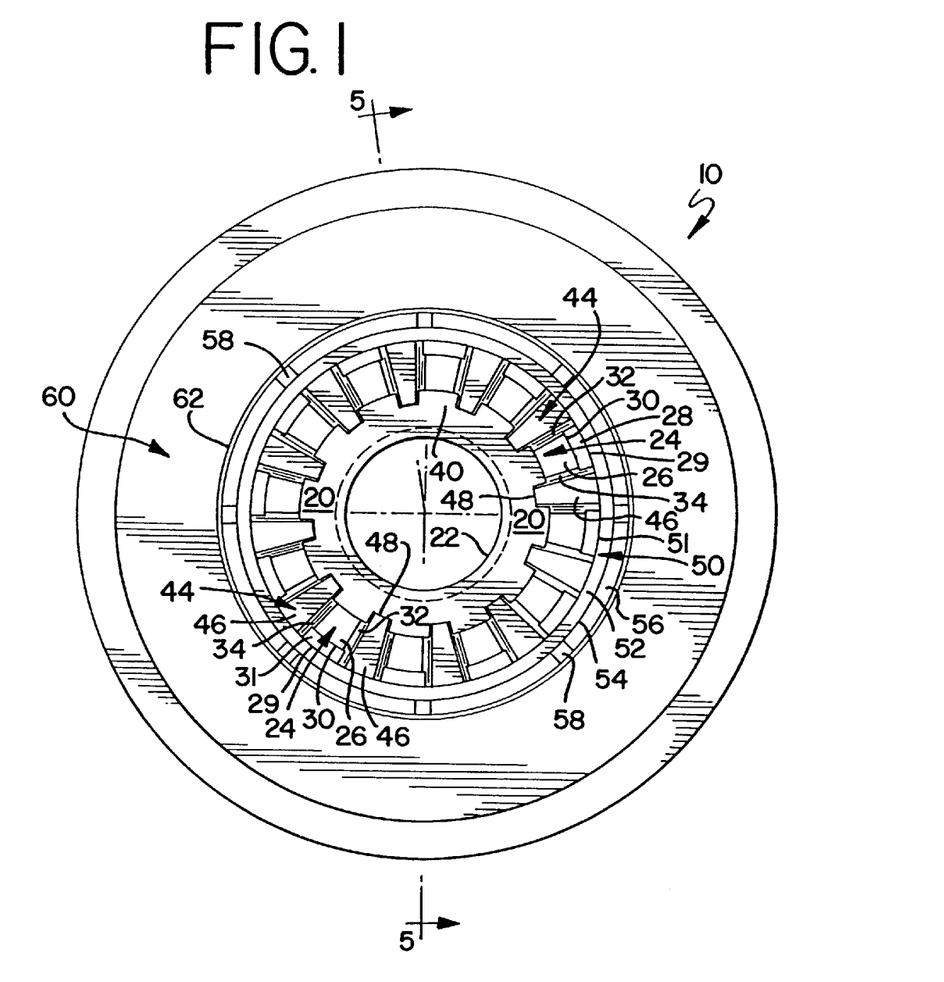
FIG. 1 is a plan view of the cavity forming portion of a first mold half of an embodiment of the present invention when viewed from the cavity side.
Figure 2:
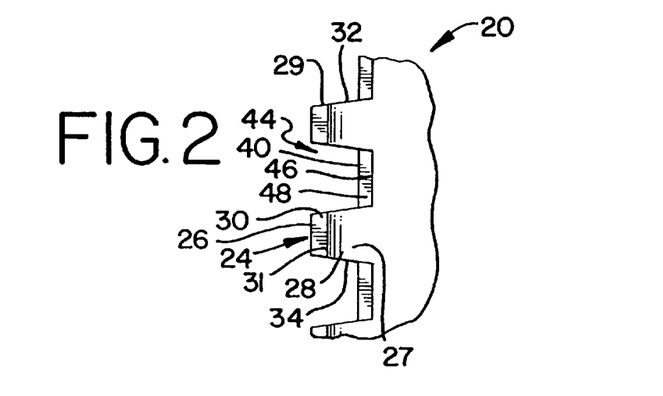
FIG. 2 is a side view taken about the periphery of the central insert of FIG. 1.
Figure 3:
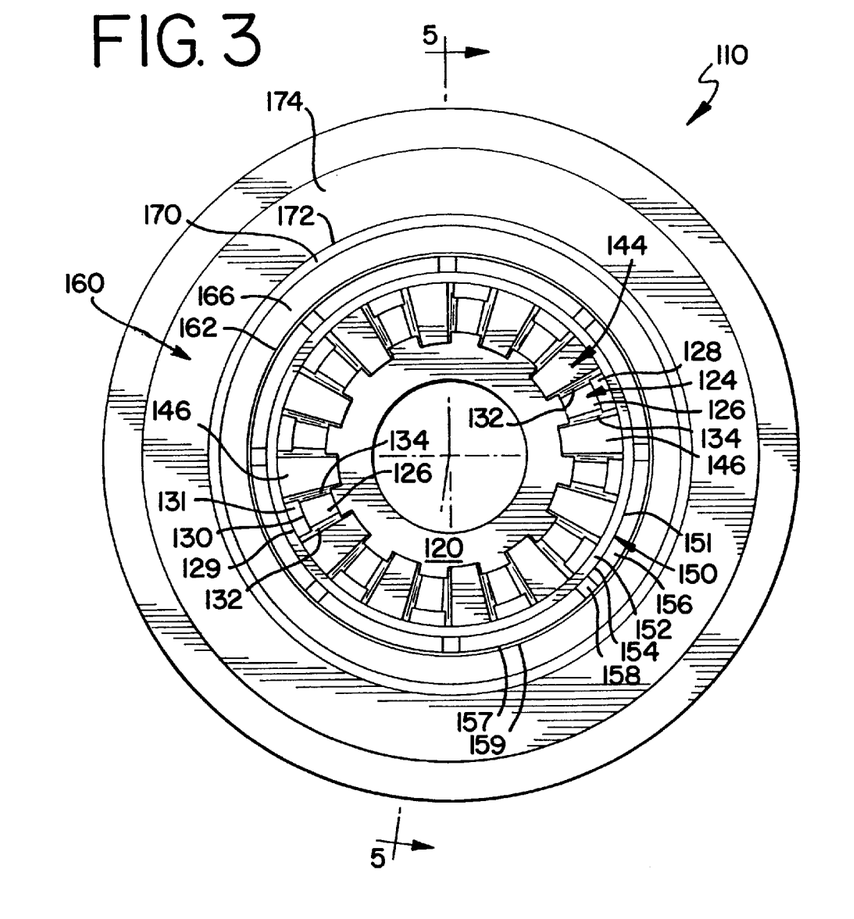
FIG. 3 is a plan view of the cavity forming portion of a second mold half of an embodiment of the present invention when viewed from the cavity side.
Figure 4:
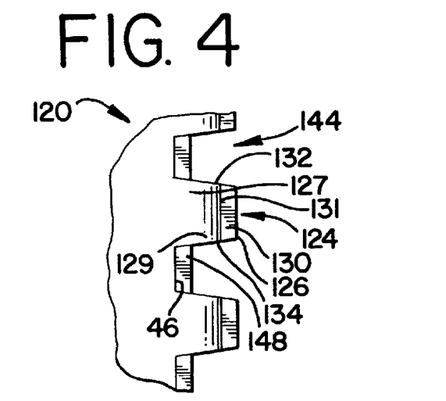
FIG. 4 is a side view taken about the periphery of the central insert of FIG. 3.

One embodiment of the apparatus for molding a component is shown in FIGS. 1 through 5. The mold is comprised of a first mold half 10 (FIG. 1) and a second half 110 (FIG. 3). The first mold half 10 has an axis 12 and second mold half 110 has an axis 112 (FIG. 5) by which the mold halves are translated relative to one another into a mating arrangement whereby a plastic injection molded part may be created within the cavity therebetween. When mated, first mold half 10 and second mold half 110 are joined along parting line 8 (see FIG. 5). Each mold half, and its respective constituent parts that are keyed and bolted together, is bolted to a mold base, as is well known in the art (and thus not shown), and in its presently preferred embodiment secured within a suitable plastic injection molding machine in a standard arrangement (also not shown).

The preferred embodiment of first mold half 10 has several constituent parts for ease of fabrication and the like. Starting from first mold half axis 12 and describing each piece or insert of greater radial configuration, there is first provided central insert 20 (see FIGS. 1 and 5). Central insert 20 is provided with generally cylindrical bore 22. The cavity side of central insert 20 (see FIG. 1) is provided with two sets of teeth with mating surfaces for interlocking with complementary surfaces of the second mold half 110 as will be explained below. The first set of teeth 24 is comprised of a first planar surface 26, a second surface 28 radially outward of first surface 26 with respect to axis 12, and an intermediate surface 30 that is between and generally orthogonal to surfaces 26, 28. Second surface 28 has a cylindrical-surfaced portion 29, which defines a cylinder parallel with axis 12. Second surface 28 further includes planar portions 31, that are coplanar. Also, there are transition surfaces 32, 34 of suitable angular orientation relative to the first and second surfaces 26, 28, to promote engagement of the first set of teeth 24 with the complementary teeth for second mold half 110, as described below. Central insert 20 is further provided with, and alternating between respective first set of teeth 24, a second set of teeth 44. Teeth 44 have one planar surface 46 extending to the outer periphery of central insert 20.

Figure 5:
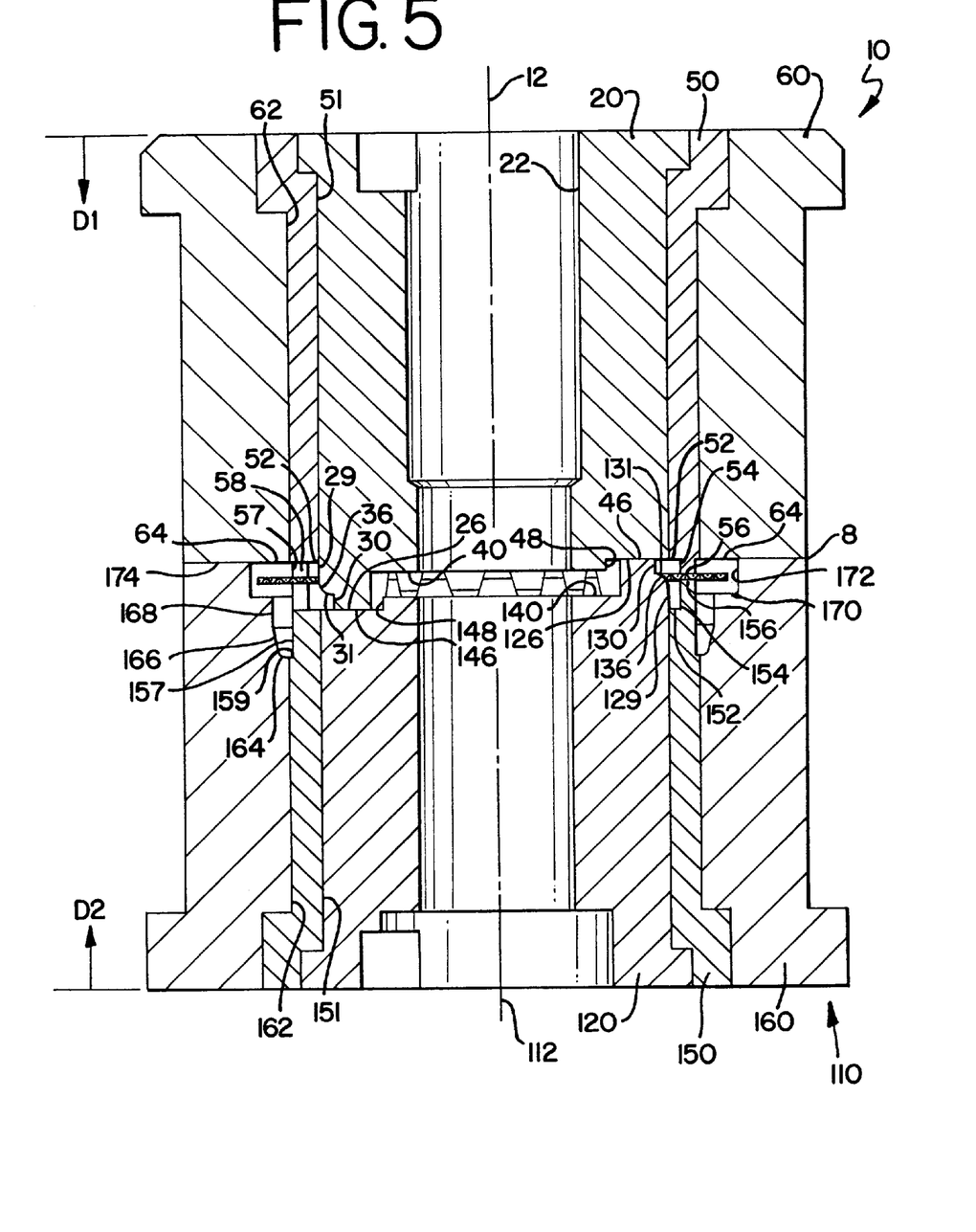
FIG. 5 is a cross-sectional view taken along lines 5—5 of FIGS. 1 and 3 depicting the cavity forming portions of the mold halves engaged to form a cavity.

Of further note with respect to the preferred embodiment of central insert 20, and in particular second surface 28 of first set of teeth 24, is that a portion of second surface 28 is radiused away from first planar surface 26 and toward cylindrical-surfaced portion 29, as denoted by arcuate portion 36 in FIG. 5.

Further with respect to this preferred embodiment, the first set of teeth 24 and second set of teeth 44 are axially displaced with respect to axis 12 of first mold half 10. Specifically, with respect to this preferred embodiment (see FIG. 5), first surface 26, intermediate surface 30, and second surface 28 are arranged in axial height, from highest to lowest from datum D1 and surface 46 is at a lower height from datum D1. (See also FIG. 2). Further with respect to this preferred embodiment, chamber wall 40 that fluidly communicates with bore 22 is provided. Wall 40 is orthogonal to axis 12 and is at an axial height between surfaces 26 and 46, and thus the second set of teeth 44 have an intermediate surface 48 between surface 46 and wall 40 (FIGS. 2 and 5).

Radially exterior from central insert 20 is sleeve 50 that in part defines the cavity corresponding to first mold half 10. Sleeve 50 is configured to receive central insert 20 snugly via cylindrical bore 51.

With respect to the preferred embodiment, sleeve 50 includes planar flats 56 (FIG. 1). As described below, flats 56 provide support for a filtration material insert during the molding operation and further assist in creating a filtration window in the resulting component (see FIG. 5). Further with respect to the preferred embodiment, sleeve 50 has annular flat 52 radially inwardly from planar flats 56, and annular walls 54 generally parallel to axis 12 which connects flats 56 to annular flat 52. In this way, annular flat 52, annular wall 52 and cylindrical surface portions 29 constitute an annular groove outward of the teeth that thereby defines an annular rib in the molded part. Suitably located between flats 56 are radially extending channels 58, allowing the fluid communication between inward annular flat 52 and radially outwardly of planar flats 56.

Radially outwardly from sleeve 50 is outer sleeve 60 that in the preferred embodiment forms a portion of the cavity corresponding to first mold half 10. Outer sleeve 60 is provided with cylindrical bore 62 in which sleeve 50 is tightly received. Outer sleeve 60 is further provided with annular flat 64 that forms a portion of the cavity defining surface of first mold half 10.

As is well known in the art, central insert 20, sleeve 50 and outer sleeve 60 are appropriately keyed and provided with appropriate retention means, such as bolts, to retain them with other inserts on a mold base and properly secure all components together to thereby establish first mold half 10. Further, in the preferred embodiment an appropriate runner is located such as in outer sleeve 60 and sleeve 50, and dimensioned as is well known in the art to permit the injection of resin into the cavity formed by first mold half 10 and second mold half 110.

As for second mold half 110, beginning from the axis 112 and going outwardly therefrom in description, there is central insert 120 (see FIG. 3). In many respects, central insert 120 of second mold half 110 has similar features to that of central insert 20 and consequently these similar features have been labeled with numeric designations like that of central insert 20, incremented by 100. In particular, in the preferred embodiment central insert 120 has a third set of teeth 124 (similar to the first set of teeth 24 of the first mold half 10) with first planar surface 126 that mate with planar surface 46 of second teeth 44 on central insert 20. Further, second surface 128 is provided on teeth 124 and is connected to first planar surface 126 via intermediate surface 130 (see FIG. 4). Second surface 128 includes planar portions 131, that are coplanar, and further include surfaces 129 that are about mold axis 112 and define a cylindrical surface parallel to axis 112. Also, angularly displaced from first surface 126 and second surface 128 of third teeth 124 are transition surfaces 132, 134. Alternating between third teeth 124 are fourth set of teeth 144 (which are also similar to the second set of teeth 44 of the first mold half). Fourth set of teeth 144 include planar surfaces 146 that mate with planar surface 26 of first teeth 24 on central insert 20.

Figure 5A:
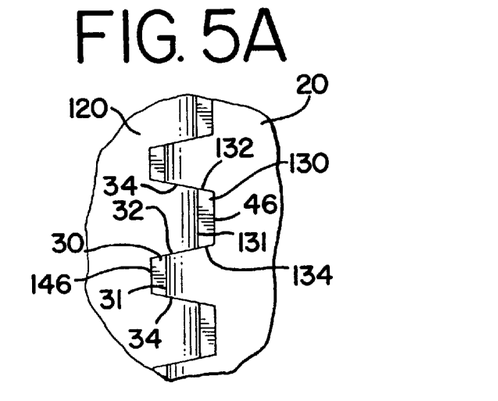
FIG. 5A is a side view as in FIGS. 2 and 4 when the central inserts of the respective mold halves are engaged.

The teeth of central insert 120 are so configured to mesh with the teeth of insert 20, and thereby form a portion of the annular interior of the cavity for the molded product (see FIG. 5A). In this configuration, the third set of teeth 124 are geometrically defined to bear against, and thereby create a seal for resin with the complementary second set of teeth 44 of insert 20. Similarly, fourth set of teeth 144 bear against and are complementary with the first set of teeth 24 of insert 20. In particular, it is of note that upon meshing or interlocking of the teeth, second surface coplanar portions 131 of third teeth 124 are parallel to the second surface coplanar portions 31 of first teeth 24.

Thus, in the preferred embodiment, this is accomplished by axially displacing the teeth of central insert 120 with respect to axis 112 of second mold half 110 an amount to complement the axial height of the corresponding teeth of central insert 20. Accordingly, the axial heights from highest to lowest from datum D2 (see FIG. 5) are first surface 126, second surface 128, and then surface 146. Furthermore, in the preferred embodiment, transition surfaces 132, 134 are complimentarily angled to mesh and bear against transition surfaces 32, 34 in a sealing engagement minimizing flash or the like of resin when first mold half 10 and second mold half 120 are engaged (see FIG. 5A).

Similar to central insert 20, and in this preferred embodiment for central insert 120, second surface 128 is preferably radiused as shown by radius 136 (FIG. 5). Also with respect to this preferred embodiment chamber wall 140 is provided that is at an axial height, relative to datum D2, between surfaces 128 and 146, which thus further establishes intermediate surface 148 (see FIG. 5).

Proceeding radially outwardly from central insert 120 for second mold half 110, is sleeve 150 with cylindrical bore 151 that sealingly engages central insert 120 (see FIGS. 3 and 5). As to the pertinent cavity defining portions of sleeve 150 for the preferred embodiment, there is provided flat 156 that provides support for filtration material that is inserted before resin is injected into the cavity and also defines the resulting filtration window in the resulting component. It is of note that flat 156 functions as the means for supporting filtration material and may further serve to define the filtration window in the resulting product made by the cavity defined by second mold half 110.

Further, with respect to the preferred embodiment, sleeve 150 has annular flat 152 radially inwardly from flats 156, and annular wall 154 connected therebetween generally parallel to axis 112. Also sleeve 150 is provided with annular wall 157 radially exterior to filtration support means 156 which in turn transitions to annular flat portion 159. In this fashion, annular flat 152, annular wall 154, and cylindrical surface portions 129 constitute an annular groove outward of the teeth that thereby creates an annular rib in the molded part. Further provided in the preferred embodiment of sleeve 150 are radial channels 158 that allow for fluid communication between annular flat 152 and cavity portions radially outwardly of flats 156.

Also, in the preferred embodiment, radially outward from sleeve 150 is outer sleeve 160 that forms a portion of the cavity (see FIGS. 3 and 5). Outer sleeve 160 is provided with cylindrical bore 162 that permits the secure engagement of outer sleeve 160 with sleeve 150. Outer sleeve 160 is provided with interior annular flat 164 that transitions to tapered side wall 166, which in turn transitions into annular side wall 168. In this way, tapered side wall 166 constitutes a means for forming an integral tapered wall. Also, annular side wall 168 in turn is connected to outer annular flat 170 that in turn is connected to outer annular side wall 172. Thus, outer annular side wall 172 and outer annular flat 170, in combination with annular flat 64 constitutes a means for forming an integral annular flange. Outer annular side wall 172 connects to annular outer wall 174 for the outer sleeve 160.

Second mold half 110, according to the preferred embodiment, thus includes central insert 120, sleeve 150, and outer sleeve 160. Further, as is well known in the art, an appropriately located runner for plastic resin may be positioned, such as radially exterior to the outer annular side wall 172 (not shown). Further ejection pins of an appropriate number and arrangement may be situated for ejection of a finished part, such as through the outer sleeve 160, to allow for proper ejection of the finished molded component. Again, the various components of the preferred embodiment for the second mold half 110 are properly keyed, secured by appropriate means both together and with other conventional components in a mold base (not shown), as is well known to those of ordinary skill in the art. Further, the various components of mold halves 10, 110 of the preferred embodiment are composed of a suitable conventional tool steel for use as plastic injection molds.

Operation of the foregoing preferred embodiment of the apparatus of the present invention will be described below. Respective mold bases receive the first mold half components and second mold half components in typical fashion and conventionally constructed as is well known in the art and are suitably mounted on a standard injection molding machine (not shown). This injection molding machine includes a plastic resin heating section that heats and transports molten plastic to the mold cavity via gates and runners and the like, which are well known in the art and thus not detailed herein. The molding machine further includes a hydraulic section that retains each mold base with respective mold halves 10, 110 therein, and at an appropriate stage in the molding cycle can move the mold halves relative to one another via a hydraulic ram or the like. Prior to movement, however, and in this preferred embodiment, an annulus of filtration material 210 is inserted into the second mold half 110 overlying filtration support means or flat 156 (see FIG. 5).

First mold half 10 and second mold half 110 are moved relative to one another into engagement along axes 12, 112 and completely interlock or engage along parting line 8 as shown in FIG. 5. The mold halves are held together in that position under high pressure while resin molding material is injected under high pressure into the cavity formed between the interlocking mold halves. When the material solidifies such as by cooling via conventional internal water cooling channels of the mold base (not shown), mold halves 10, 110 are separated by relative movement of the mold halves to permit removal of molded part 200. Removal of this part may be by way of conventional ejection pins (not shown). Following this part ejection, the mold halves are in position to repeat the molding cycle. It should be noted that most of the foregoing operations are mechanically actuated, but that insertion of the filtration material may be performed by automatic feeding equipment or manually by an operator.

Figures 6, 7, 8, 9, 10:
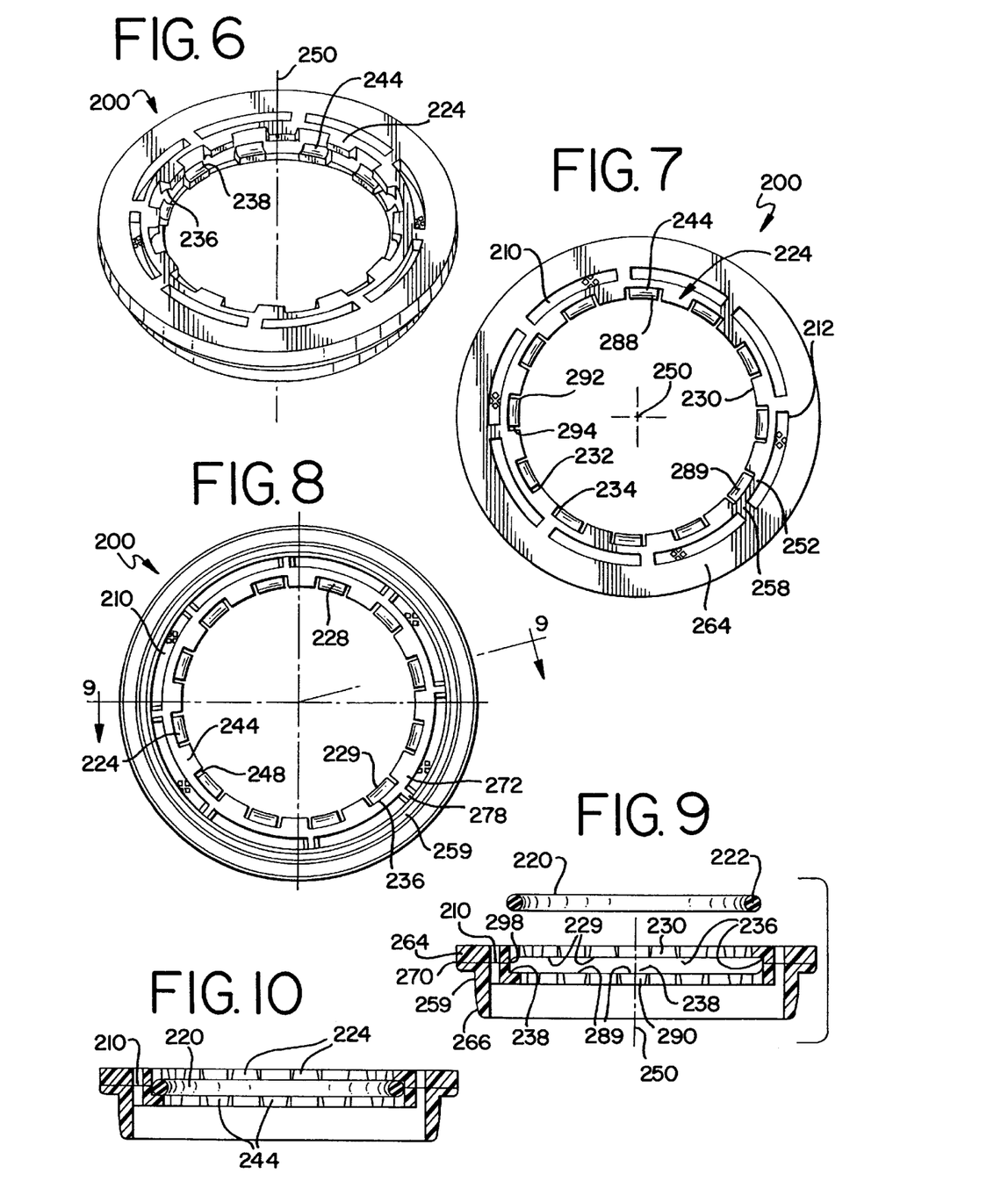
FIG. 6 is a perspective view of a resulting molded component from the apparatus depicted in FIGS. 1 through 5.
FIG. 7 is a plan view of one side of the component of FIG. 6.
FIG. 8 is a plan view of the other side of the component depicted in FIG. 6.
FIG. 9 is a cross-sectional view taken along lines 9—9 of FIG. 8 in combination with the cross-section of a typical O-ring of circular cross-section before the O-ring is placed within the plastic component.
FIG. 10 is a cross-sectional view of the component and O-ring of FIG. 9 with the O-ring retained within the component.

The resulting product from this foregoing molding apparatus and method is shown in FIGS. 6 through 10 and generally denoted as 200. Component 200 includes an axis 250, as defined by the bore therethrough, and a first set of castellations and a second set of castellations, 224, 244 respectively projecting inwardly and encircling the bore. First castellations 224 have interior surfaces 228 that include planar portions 229 that are generally coplanar (see FIGS. 8 and 9). Similarly, second castellations 244, that are angularly displaced about axis 250 from first castellations 244, have interior surfaces 288 that include planar portions 289 that are generally coplanar (see FIGS. 7 and 9). As shown in FIGS. 9 and 10, the component 200 is accordingly adapted to receive a suitably dimensioned O-ring 220 of elastomeric material. O-ring 220 may be inserted axially into component 220 between first castellation 224 and second castellation 244 by manual or automatic means.

In the preferred embodiment, first castellations 224 further include curved interior wall portions 236 that conform to a semi-toroidal configuration, such as that of an O-ring with a circular cross-section, which are formed by surface 136 of third teeth 124. The remainder of first castellations 224 are lateral wall 230 formed by intermediate surface 130 of third teeth 124 and radial walls 232, 234 formed by surfaces 132, 134 (see FIGS. 6, 7 and 9). Similarly, second castellations 244 further include in the preferred embodiment curved portions 238 that are semi-toroidal and formed by surface 36 of first teeth 24. Other features of second castellation 244 are lateral wall 290 formed by intermediate surface 30 of first teeth 24 and radial walls 292, 294 formed by transition surfaces 32, 34 (see FIGS. 6, 7 and 9).

Radially outwardly from castellations 224, 244 in the preferred embodiment is filtration material 210 molded into component 200. Also, in the preferred embodiment there are a plurality of filtration windows 212. Filtration windows 212 are defined by interior annular ribs 252 and 272, joined integrally with radial ribs 258, 278, respectively, which in turn are integrally joined with outer annular ribs 264, 259, respectively (see FIGS. 7 and 8). In this respect, outer annular ribs 259, 264 further form annular flange 270, with filtration material 210 molded therein (see FIG. 9).

Further, in the preferred embodiment, outer annular rib 259 is extended axially along axis 250 and tapered to form axial taper 266 (see FIG. 9).

As noted above, in the preferred embodiment, first castellation 224 and second castellation 244 are provided with semi-toroidal surfaces 228, 288 that conform to the curvature of cross-section 222 of O-ring 220. Thus, when the component is assembled with an O-ring 220 and suitably mounted upon a shaft or other cylindrical structure, the O-ring 220 may sealingly engage the cylindrical structure or shaft and component 200 may sealingly engage the O-ring 220 by way of first and second castellations 224, 244 to thereby permit a seal of the component 200 with the shaft or cylindrical structure and thus promote the efficiency of the filtration material 210 in component 200.

However, it should be noted that the invention claimed herein may have applications beyond that envisioned for the preferred embodiment, and indeed it is believed that the first and second castellations herein disclosed may be utilized in a broad range of applications requiring retention of O-rings in plastic components exposed to a range of environmental factors, including pressures and temperatures.

The preferred embodiment herein described is constructed as follows. Component 200 is preferably a monolithic molded plastic resin, preferably of 33% glass filled nylon 6-6, heat stabilized. It is to be noted, that this plastic material is illustrative and many other suitable materials well known in the art could be used, including nylon 6-12 or polyester suitable for the fluid and operating temperature envisioned for the operating environment of the assembly. Further, in the preferred embodiment, the filtration material 210 is a 52 micron (0.002 inch) polyester screen with 20% open area. However, other similar filtration materials may be used, such as nylon, steel, brass, stainless steel screen, or others well known in the art, the selection of which is dependent again upon the operating environment envisioned.

Dimensionally, the preferred embodiment of the component herein has an interior diameter of about 1.02 inch (25.9 mm) as between lateral walls 230 of first castellations 228 and also as between lateral walls 290 of second castellations 244. Annular wall 298 has an interior diameter of about 1.14 inch (29.0 mm). As for the width of first and second castellations, the maximum width, as measured angularly for the first castellations 228 is about 13.5° with respect to axis 210, and the maximum width for second castellations 244 is about 16.5°. Further, radial walls 232, 234, 292, 294 are about 10° oblique from the axis 210. Filtration windows are annularly arranged, with interior walls of about 1.190 inch (30.23 mm) in diameter and outer walls of about 1.287 inch (32.69 mm), and the radial ribs 278 and 258 are of maximum width of about 0.060 inch (1.52 mm). Wall 259 has outer diameter of about 1.407 inch (35.7 mm), and a taper section 266 diminishing therefrom at about 9° oblique from axis 210. Further, flange 270 outer diameter is about 1.560 inches (39.6 mm). In the axial dimension, first and second castellations 228, 288 are typically 0.042 inch (1.07 mm) thick, and the axial length of annular wall 298 is about 0.112 inch (2.84 mm). The filtration material 210, of about 0.004 inch (0.102 mm) thickness is located about 0.072 inch (1.83 mm) from the flange side of the component. Full axial length of the component is about 0.305 inch (7.75 mm). So configured, there is about a 0.072 inch (1.83 mm) clearance for an O-ring 220, which itself is dimensioned about 0.989 inch (25.1 mm) I.D.×0.07 inch (1.78 mm) cross-sectional diameter and may be composed of a suitable synthetic rubber or the like.

The preferred molding apparatus is dimensioned as follows. For the first mold half 10 starting from the axis 12, bore 22 diameter is about 0.50 inch (12.7 mm), second teeth 44 surfaces 46 begin at 0.72 inch (18.3 mm) diameter and end at 1.117 inch (28.37 mm) diameter. First teeth 24 first surfaces 26 range from 0.80 inch (20.3 mm) to 1.023 inch (25.98 mm) diameters, with about 13.5° widths, and second surfaces 28 continue to 1.117 inch (28.37 mm) diameter. Surfaces 32, 34 begin from surfaces 26 at about 16.5° width and slope obliquely 10° from the axis 12 until reaching surface 46. Annular flat 52 ranges from 1.117 inch (28.37 mm) to 1.194 inch (30.33 mm) diameter and flat 56 extends to 1.293 inch (32.84 mm) diameter. Bore 62 has 1.313 inch (33.35 mm) diameter and outer sleeve 60 has an outer diameter of 2.00 inch (50.88 mm) (thus, in the preferred embodiment there is an annular flat radially outwardly of flats 56). Axially, as measured from datum D1, second teeth 44 surfaces 46 are at 1.377 inch (34.98 mm), chamber wall 40 is at 1.417 inch (35.99 mm). For first teeth 24, the coplanar surfaces 31 are at 1.493 inch (37.92 mm), arcuate surface 36 have a radius of 0.030 inch (0.76 mm), and first surfaces 26 are 1.533 inch (38.94 mm). As for sleeve 50, annular flat 52 is at 1.377 inch (34.98 mm), and flats 56 are at 1.428 inch (36.27 mm), the channels 58 are each 0.060 inch (1.52 mm) wide. Surface 64 is at 1.377 inch (34.98 mm).

For the second mold half 110 starting from the axis 112, bore 122 diameter is about 0.050 inch (12.7 mm), fourth teeth 144 surfaces 146 begin at 0.72 inch (18.29 mm) diameter and end at 1.117 inch (28.37 mm) diameter. Third teeth 124 first surfaces 126 range from 0.80 inch (20.32 mm) to 1.023 inch (25.98 mm) diameters, with about 13.5° widths, and second surfaces 128 continuing to 1.117 inch (28.37 mm) diameter. Surfaces 132, 134 begin from surfaces 126 at about 16.5° width and slope obliquely 10° from the axis 112 until reaching surface 146. Annular flat 152 ranges from 1.117 inch (28.37 mm) to 1.194 inch (30.33 mm) diameter, and flats 156 extend to 1.293 inch (32.84 mm) diameter. Bore 162 has a diameter of 1.313 inch (33.35 mm) (thus, in the preferred embodiment there is an annular flat 159 radially outwardly from flats 156 on sleeve 150). Outer sleeve 160 has annular flat 164 extending to a diameter of about 1.361 inch (34.57 mm) that transitions to a taper of about 9° oblique from the axis 112 to annular wall 166 at 1.409 inch (35.79 mm) diameter, that in turn proceeds to outer annular flat 170 with an outer diameter of 1.565 inch (39.75 mm). Outer sleeve 160 is about 2.0 inch (50.8 mm) in diameter. Axially, as measured from datum D2, fourth teeth 144 surfaces 146 are at 1.221 inch (31.01 mm), chamber wall 140 are at 1.261 inch (32.03 mm). For third teeth 124, coplanar surfaces 131 are at 1.337 inch (33.96 mm), arcuate surfaces 136 are radiused 0.030 inch (0.76 mm), and first surfaces 126 are at 1.377 inch (34.98 mm). As for sleeve 150, annular flat 152 is at 1.221 inch (31.01 mm), flats 156 are at 1.324 inch (33.63 mm), and outer annular flat 159 is at 1.071 inch (27.20 mm). Further, channels 158 are at 0.060 inch (1.52 mm) widths. As for sleeve 160, interior annular flat 164 is at 1.071 inch (27.20 mm), annular wall 168 is about 0.097 inch (2.46 mm) wide, annular wall 170 is at about 1.272 inch (32.31 mm) and the height of outer sleeve 160 is about 1.377 inch (34.98 mm).

The previously described apparatus and method is the preferred embodiment, but alternative constructions thereof may be constructed without departing from applicants' presently contemplated inventions. For example, although each mold half 10 and 110 has been described as comprising several components, fewer sleeves or just one insert defining each side of the cavity may possibly be constructed.

Further, although each mold half 10 and 110 has been described as including flats supporting filtration material that may be inserted into the mold before molding, only one flat need be included on one mold half and this flat may bear against a corresponding complementary surface, such as a planar surface, on the other mold half to thereby support the filtration material during molding and also provide a filtration window in the resulting molded component. Alternatively, a plurality of flats may bear against a corresponding complementary surface of the other mold half, with filtration material therebetween, to thereby provide a plurality of filtration windows in the product. Moreover, and obviously, appropriate annular flats and radial channels may be eliminated from one or both mold halves to thereby provide annular or radial ribs (or a combination thereof) alternating on either side of the filtration material, or have radial ribs on one side of the filtration material, or provide annular ribs on one side of the filtration material, or a combination thereof. Additionally, the filtration material and the flat supporting the filtration material of the mold may be located at various axial heights other than described for the preferred embodiment, including not only axially beyond the coplanar surfaces of the first and second castellations but also axially beyond the first and second castellations themselves. Further, the filtration windows themselves may be of various shapes and configurations, including having windows located on only a particular angular range (such as one angular quadrant) or at a particular radial range (such as between the tapered annular wall and the flange perimeter).

Different geometric configurations for the flange and tapered wall from that of the preferred embodiment are also possible. The flange for the component may be located radially or angularly at selected locations to provide a keying function for the component so that it may install in only one orientation into the area that it is to be received, among other things. Also, the flange may be located axially on either side of the castellations, or in between the first and second set, or on either side of the filtration material. The tapered wall may similarly be located at various angular and axial locations for the particular application presented. Further, the flange and taper for the component as well as the corresponding portions of the second mold half 110 herein described may be considered optional in some applications of the invention.

Also, with respect to the above described apparatus, method, and component, a variety of castellation creating geometries may be readily envisioned and intended as covered by the claimed inventions herein. Although in the preferred embodiment the mating surfaces of the first teeth of the first mold half with the surfaces of the second teeth are planar and perpendicular to the axes of the mold halves, other non-planar or non-perpendicular geometries may be conceived, so long as the surfaces are complementary between mold halves and form a relatively effective seal to the resin introduced in the cavity during the molding operation. Accordingly, the castellation interior surfaces, and thus the corresponding cavity forming surfaces of the mold halves, may be planar but oblique to the respective mold half axes to thereby be adapted to retain an O-ring that is not uniform in thickness or requires varying retention pressures over its circumference due to various pressure differentials to which the assembly is exposed or other unique factors involved in a particular application.

Further, although it is presently preferred that the castellations are trapezoidal in a cross-section (see FIGS. 9 and 10), the castellations may be so configured to have either rectangular cross-section or triangular cross-section. Further, although it is preferred that first and second castellations 224, 244 alternate angularly with a minimum amount of angular gaps 248 therebetween, it is readily apparent that the distance between angular gaps may be increased by altering the angular displacement of the transition surfaces 32, 34, 132, 134, of the pertinent insert or mold cavity surface, or creating one or more set of teeth intervening the first set 24, 124 and second set of teeth 44, 144 that do not have a cavity forming planar surface perpendicular to the mold half axes 12, 112 to thereby create greater angular or axial spacing between the first and second castellations. Still further, the sets of teeth with alternating axial surfaces that are not coplanar may allow for retaining an O-ring in a profile that is not planar, but rather at various axial heights relative to the bore axis, as may be required in a unique application.

Furthermore, the castellations herein described in the preferred embodiment are configured for receiving an O-ring of circular cross-section. It should be understood that first and second castellations 224, 244 could be constructed that would lack curved interior surfaces 228, 288 (i.e. the arcuate portions 36, 136) to receive a rectangular cross-sectioned O-ring. This configuration could be accomplished by eliminating curved surfaces 36, 136 on central inserts 20, 120 respectively. Accordingly, the appropriate mold cavity surfaces would be planar (e.g. surfaces 31 or 131) and cylindrical (e.g. surfaces 29 or 129) to thereby create orthogonal surfaces conforming to the rectangular cross-section of the O-ring.

The disclosed and claimed apparatus, method for producing components, and components have numerous advantages. The disclosed apparatus and method is a simple construction, yet provides for a series of retaining members in a plastic component for an O-ring that suitably engages and embraces the O-ring in a suitable fashion for the application desired. The apparatus and method involves a relatively simple construction of two mold halves that lack a collapsing feature, requiring but one uncomplicated molding operation, and consequently permit production of components in a cost effective manner. Further, the disclosed apparatus and method may be maintained and operated in a relatively uncomplicated manufacturing environment using typical injection molding machines. Further, the disclosed component is economical to produce yet provides a sufficient retainer mechanism for an O-ring to permit the assembly to operate properly in a range of operating environments for the application desired.

While the preferred embodiments of the aspects of this invention have been disclosed, it is to be understood that the invention is not limited to the disclosed examples or their intended use. Modifications of design in addition to those discussed can be made without parting from the invention. The scope of the invention is indicated in the appended claims and all changes that come within the meaning and range of equivalency of the claims are therefor intended to be embraced therein. Thus, while the invention has been described with reference to particular embodiments, modification of structure, materials, and the like will be apparent to those skilled in the art, yet still fall within the scope of the invention.

What is claimed is:

1. A monolithic molded plastic component adapted for receiving an O-ring comprising:

a plastic member having a bore therethrough, the member having a first and second set of monolithic castellations projecting inwardly into the bore and encircling the bore, and having an annular wall between the first and second castellations thereby defining a gap therebetween into which an O-ring may be received.

2. The plastic component of claim 1 wherein the member includes one or more apertures each having a periphery and further comprising filtration material extending across each of the apertures and molded into the component about the periphery of each of the apertures.

3. A monolithic molded plastic component adapted for receiving an O-ring of generally circular cross-section comprising:

a plastic member having a bore therethrough thereby defining an axis, and having a first and second set of monolithic castellations projecting inwardly toward the axis and encircling the bore, and an annular wall therebetween, the first and second set of castellations generally defining respective first and second quarter-toroidal surfaces, the first quarter-torroidal surface separated from the second quarter-torroidal surface along the axis, whereby the first set of castellations and second set of castellations provide a semi-toroidal gap into which the O-ring may be received.

4. The plastic component of claim 3 wherein the member includes one or more apertures each having a periphery and further comprising filtration material extending across each of the apertures and molded into the component about the periphery of each of the apertures.

5. A monolithic molded plastic component adapted for receiving an O-ring of generally rectangular cross-section comprising:

a plastic member having a bore therethrough thereby defining an axis, the member having a first and second set of monolithic castellations projecting inwardly toward the axis and encircling the bore, and an annular wall therebetween, the first and second set of castellations generally defining respective first and second planar surfaces generally orthogonal to the axis, the first planar surface separated from the second planar surface along the axis, whereby the first set of castellations and second set of castellations provide a rectangular gap into which the O-ring may be received.

6. The plastic component of claim 5 wherein the member includes one or more apertures each having a periphery and further comprising filtration material extending across each of the apertures and molded into the component about the periphery of each of the apertures.

* * * * *